Figure 1:
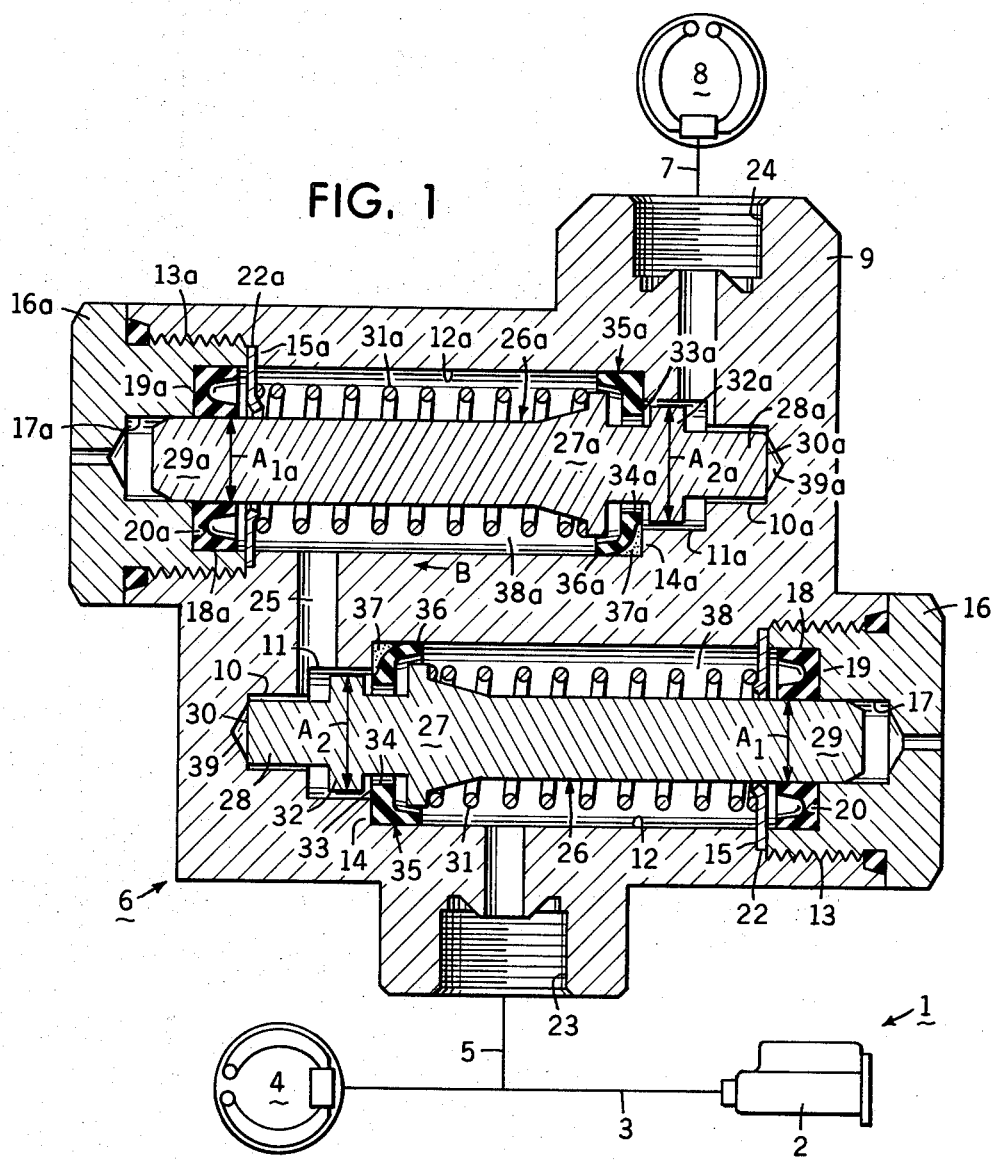

United States Patent
Marting

[15] 3,697,138
[45] Oct. 10, 1972

[54] CONTROL VALVE AND SYSTEM
[72] Inventor: Paul G. Marting, Ballwin, Mo.
[73] Assignee: Wagner Electric Corporation, Newark, N.J.
[22] Filed: May 8, 1970
[21] Appl. No.: 35,823

[52] U.S. Cl. ..........303/6 C, 60/54.5 E, 137/505.12, 188/349
[51] Int. Cl. ............................B60t 8/26, B60t 11/34
[58] Field of Search.....303/6 C, 22 A; 188/345, 349; 60/54.5 E; 137/505, 505.12, 506, 216, 217; 73/203

[56] References Cited

UNITED STATES PATENTS

| | | | |
|---|---|---|---|
| 3,155,107 | 11/1964 | Woodford | 137/218 |
| 3,423,936 | 1/1969 | Stelzer | 137/505 X |
| 3,278,241 | 10/1966 | Stelzer | 303/6 C |
| 3,375,852 | 4/1968 | Milster | 303/6 C |
| 3,385,637 | 5/1968 | Kersting | 303/6 C |
| 3,462,201 | 8/1969 | Lewis et al. | 303/6 C |
| 3,508,792 | 4/1970 | Bueler | 303/6 C |

FOREIGN PATENTS OR APPLICATIONS 997,727   1/1952   France..........................73/203

Primary Examiner—Milton Buchler
Assistant Examiner—John J. McLaughlin
Attorney—Joseph E. Papin

[57] ABSTRACT

A control valve for use in a hydraulic brake system having a pressure source and a pressure responsive brake is provided with a pair of proportioning members in series flow relation which respectively proportion the fluid pressure supplied from said source to said brake. One of the proportioning members is actuated in response to supplied fluid pressure from the source in excess of a predetermined value to effect the application of a proportionally reduced pressure to the brake, and the other of the proportioning members is actuated in response to the proportionally reduced pressure of another predetermined value predeterminately in excess of the first named predetermined value to further proportionally reduce the pressure applied to said brake.

30 Claims, 2 Drawing Figures

INVENTOR
PAUL G. MARTING

CONTROL VALVE AND SYSTEM

This invention relates in general to hydraulic brake systems and in particular to a control valve for proportioning the pressure of said system under preselected conditions.

SUMMARY

In the past, various types of control valves have been utilized in a hydraulic brake system to provide a two-step or double-knee point proportioning of the fluid pressure supplied from the fluid pressure source to energize the vehicle rear brakes in order to allow the actual front brake to rear brake torque distribution to approach the theoretical or ideal torque distributions therebetween. One of the disadvantageous features of such past control valves was that the two-step or double-knee point proportioning was accomplished by effecting an area change on the proportioning piston at a predetermined fluid pressure which necessitated somewhat complex valving and usually resulted in complex tolerance and concentricity manufacturing problems.

The principle object of the present invention is to provide a control valve for effecting double knee point proportioning which overcomes the aforementioned disadvantageous or undesirable features, and this, as well as other objects and advantageous features of the present invention, will become apparent hereinafter.

Briefly, the present invention embodies both a fluid pressure system having a fluid pressure source and a fluid pressure responsive brake and also a control valve for said system wherein said control valve includes a pair of modulating means for controlling the application to said brakes of pressure supplied from said source with one of said modulating means being generally operable in response to fluid pressure in excess of a predetermined value to perform a fluid modulating operation thereon for varying the pressure immediately upstream thereof and with the other of said modulating means being operable generally in response to the varied pressure in excess of another predetermined value predeterminately in excess of the first named predetermined value to perform a fluid modulating operation thereon for also varying the pressure immediately upstream thereof.

RELATED PATENTS

This patent application is related to U.S. Pat. application Ser. No. 730,101 filed May 17, 1968, by Edward J. Falk, said application being assigned to the common assignee of this patent application which is a patentably distinct improvement.

DRAWING DESCRIPTION

Figure 2:
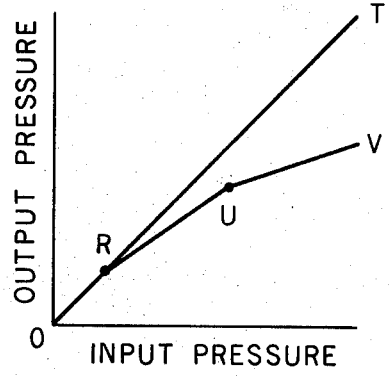

In the drawings which form a part of the specification and wherein like numerals refer to like parts wherever they occur:

FIG. 1 is a schematic diagram of a brake system illustrating a control valve therein in cross section embodying the present invention, and FIG. 2 is a graphical representation illustrating the applied output fluid pressure effected by the control valve of FIG. 1 in response to the supplied input fluid pressure.

Referring now to the drawings in detail and in particular to FIG. 1, a brake system 1 is provided with an operator actuated master cylinder 2 of a type well known in the art which is connected by a conduit 3 to vehicle front brakes 4, and another conduit 5 is interconnected between the conduit 3 and the inlet port of a control or proportioning valve 6. The outlet port of the control valve 6 is connected by a conduit 7 to the vehicle rear brakes 8.

The control valve 6 is provided with a housing 9 having stepped bores 10, 11 and 10a, 11a coaxially aligned therein with stepped counterbores 12, 13 and 12a, 13a, respectively. Shoulders or abutments 14, 14a are provided on the housing 9 between the bores and counterbores 11, 12 and 11a, 12a, and other shoulders or abutments 15, 15a are provided on the said housing between the counterbores 12, 13 and 12a, 13a, respectively. The housing counterbores 13, 13a are closed by closure members or end plugs 16, 16a threadedly received therein, and said closure members are provided with stepped bores 17, 18 and 17a, 18a which have shoulders 19, 19a therebetween, respectively. Annular seals 20, 20a are provided in sealing engagement with the closure member stepped bores 18, 18a and seated against the shoulders 19, 19a about the smaller stepped bores 17, 17a, and annular spring retainers 22, 22a are positioned in abutting engagement between the interior ends of the closure members 16, 16a and the housing shoulders 15, 15a, respectively. An inlet port 23 which receives the conduit 5, as previously mentioned, is provided in the housing 9 intersecting with the housing counterbore 12 adjacent to the mid-portion thereof, and an outlet port 24 which receives the conduit 7, as previously mentioned, is also provided in said housing intersecting with the housing stepped bore 11a. A connecting passage 25 is provided in the housing 9 having one end connecting with the housing stepped bore 11 while the other end thereof intersects with the housing counterbore 12a adjacent the leftward end thereof.

Modulating or proportioning members, such as the pistons indicated generally at 26, 26a, are provided with head portions 27, 27a integrally formed between opposed reduced extensions or stem portions 28, 29 and 28a, 29a, respectively. The extensions 28, 28a and 29, 29a are slidably and guidably received in the housing bores 10, 10a and the closure member bores 17, 17a, said extensions 29, 29a extending through the closure member seals 20, 20a in sealing engagement therewith, and said extensions 28, 28a are provided with free end portions 30, 30a for abutting engagement with the end walls of the housing bores 10, 10a, respectively. Metering or proportioning springs 31, 31a are biased between the proportioning piston head portions 27, 27a and the retainers 15, 15a normally urging the proportioning pistons 26, 26a toward their normal or inoperative positions engaging the free end portions 30, 30a thereof with the end walls of the housing bores 10, 10a, respectively. It should be noted that the precompressed force $F_c$ of the spring 31 is predeterminately less than the precompressed force $F_s$ of the spring 31a.

The proportioning pistons 26, 26a are provided with annular valve members 32, 32a thereon between the head portions 27, 27a and the extensions 28, 28a which, in the inoperative positions of said proportioning pistons, are spaced from cooperating valve seats, 33, 33a provided about apertures 34, 34a extending axially through seating members, indicated generally at 35, 35a. The seating members 35, 35a are normally positioned in seating engagement with the housing shoulders 14, 14a, and the seating member apertures 34, 34a are radially spaced from the periphery of the proportioning pistons 26, 26a, respectively. Peripheral lip portions 36, 36a are integrally provided on the seating members 35, 35a normally in sealing engagement with the housing counterbores 12, 12a to close return flow passages 37, 37a provided across said seating members.

A flow passage, indicated generally at B, is provided in the housing 9 connecting the proportioning pistons 26, 26a in series flow relation between the inlet and outlet ports 23, 24, said flow passage being defined by the counterbore 12, the seating member aperture 34, the bore 11, the connecting passage 25, the counterbore 12a, the seating member aperture 34a and the bore 11a. Of course, it is apparent that the housing counterbores 12, 12a between the seating members 35, 35a and closure member seals 20, 20a define inlet chambers 38, 38a in the housing 9, and the stepped bores 10, 11 and 10a, 11a define outlet chambers 39, 39a in said housing wherein the seating member apertures 34, 34a are interconnected between the inlet and outlet chambers 38, 39 and 38a, 39a, respectively. The inlet and outlet chambers 38, 39a are connected in pressure fluid communication with the inlet and outlet port 23, 24 at all times, and the connecting passage 25 connects the outlet chamber 39 with the inlet chamber 38a at all times.

It should be noted that the proportioning pistons 26, 26a are provided with substantially equal effective areas $A_1$, $A_{1a}$ defined by the sealing engagement of the proportioning piston extensions 29, 29a with the closure member seals 20, 20a and subjected to the atmosphere in the closure member stepped bores 17, 17a at all times, and the sealing engagement between the proportioning piston valve members 32, 32a and the seating member valve seat 33, 33a, as discussed hereinafter, define substantially equal effective areas $A_2$, $A_{2a}$ on said proportioning pistons which are subjected to the fluid pressure in the outlet chambers 39, 39a, respectively. The areas $A_2$, $A_{2a}$ are predeterminately greater than the areas $A_1$, $A_{1a}$.

In the operation with the component parts of the system 1 and control valve 6 positioned as shown in the drawings and as described hereinabove, a supplied or input fluid pressure P is transmitted upon operator actuation of the master cylinder 2 through the conduit 3 to effect energization of the vehicle front brake 4. The input fluid pressure P also flows from the conduit 3 through conduit 5, the inlet port 23 of the control valve 6, the inlet chamber 38, the seating member aperture 34, the outlet chamber 39, the connecting passage 25, the inlet chamber 38a, the seating member aperture 34a, and the outlet chamber 39a to the outlet port 24, and therefrom through conduit 7 to effect energization of the vehicle rear brake 8 substantially simultaneously with the aforementioned energization of the front brake 4. The input fluid pressure P acts on the effective area $A_1$ of the proportioning piston 26 to establish a closing force $PA_1$ tending to urge said proportioning piston against the compressive force $F_c$ of the metering spring 32; however, the metering spring force $F_c$ opposes movement of said proportioning piston until the input fluid pressure P attains a predetermined value R as shown on the line ORT in the graph of FIG. 2. When the predetermined value R of the input fluid pressure P is attained, the closing force $PA_1$ overcomes the compressive force $F_c$ of the metering spring 31 to move the proportioning piston 26 rightwardly from its inoperative position toward an isolating position. The movement of the proportioning piston 26 to its isolating position engages the valve member 32 with the sealing member valve seat 33 closing the sealing member aperture 34 to isolate the input fluid pressure P in the inlet chamber 38 from the output fluid pressure $P_o$ in the outlet chamber 39, and upon the engagement of the said valve member with said valve seat, the input fluid pressure P acts on the effective input area $A_2-A_1$ of the proportioning piston 26 to establish an input force which is additive to the spring force $F_c$ to substantially balance the opposed output force $P_oA_2$ established by the output fluid pressure $P_o$ acting on the effective output area $A_2$ of said proportioning piston.

From the graphical representation in FIG. 2, it is obvious that an increase in the magnitude of the input fluid pressure P in excess of the predetermined value R, as shown by the line ORT, will result in proportionally reduced increases in the output fluid pressure $P_o$ as shown by the line RU. For instance, when the input fluid pressure P is increased to a value in excess of the predetermined value R and less than the predetermined value U, the input force $P(A_2-A_1)$ is correspondingly increased and additive to the metering spring force $F_c$ to overcome the output force $P_oA_2$; therefor, the metering piston 26 is moved in a leftwardly direction toward a metering position disengaging the valve member 32 thereof from the seating member valve seat 33 to effect a metered application of the input fluid pressure P through the seating member aperture 34, the outlet chamber 39, the connecting passage 25, the inlet chamber 38a, the seating member aperture 34a, the outlet chamber 28a, to the outlet port 24 to effect a proportional increase of the output fluid pressure $P_o$ in a predetermined ration with the input fluid pressure P at the inlet port 23, as shown by the line RU in the graph of FIG. 3 wherein $$P_0 = (P(A_2-A_1) + F_c/A_2)$$

Of course, the increased output fluid pressure $P_o$ effects a corresponding increase in the output force $P_oA_2$, and when the increased output force $P_oA_2$ attains an increased value substantially equal to that of the increased input force $P(A_2-A_1)$ and the additive metering spring force $F_c$, the proportioning piston 26 is again moved toward its isolating position to re-engage the valve member 32 with the seating member valve seat 33 to again isolate the increased input fluid pressure $P$ and the increased output fluid pressure $P_0$. It is, of course, obvious that the proportioning piston 26 will be responsive to further increases in the input fluid pressure $P$ to effect further corresponding proportional increases in the output fluid pressure $P_0$ in the same manner as previously described.

Of course, the output fluid pressure $P_0$ also acts on the effective area $A_{1a}$ of the proportioning piston 26a to establish another closing force $P_0A_{1a}$ urging said proportioning piston against the compressive force $F_s$ of the metering spring $31a$; however, the metering spring force $F_s$ prevents movement of said proportioning piston until the output fluid pressure $P_0$ exceeds the predetermined value U, as shown on the line RUV in the graph of FIG. 2. When the predetermined value U is attained, the closing force $P_0A_{1a}$ overcomes the compressive force $F_s$ of the metering spring $31a$ to move the proportioning piston $26a$ leftwardly from its inoperative position toward an isolating position. The movement of the proportioning piston $26a$ to its isolating position engages the valve member $32a$ with the seating member valve seat $33a$ closing the seating member aperture $34a$, to isolate the output fluid pressure $P_0$ in the inlet chamber $38a$ from the output fluid pressure $P_o$ in the outlet chamber $39a$, and upon the engagement of said valve member with said valve seat, the output fluid pressure $P_o$ in said inlet chamber acts on the effective input area $A_{2a}-A_{1a}$ of the proportioning piston $26a$ to establish another input force $P_0(A_{2a}-A_{1a})$ additive to the spring force $F_s$ to substantially balance the output fluid pressure in the outlet chamber $39a$, hereinafter referred to as Por for clarity's sake, which acts on the effective area $A_{2a}$ in opposition to the input force $P_0(A_{2a}-A_{1a})$.

From the graphical representation in FIG. 2, it is obvious that increases in the magnitude of the fluid pressure Po in excess of the predetermined value U will result in a further proportionally reduced increase in the output fluid pressure Por, as shown by the line UV. For instance, when the fluid pressure Po is increased to a value in excess of the predetermined value U, the input force $P_0(A_{2a}-A_{1a})$ is correspondingly increased and additive to the metering spring force Fs to overcome the output force Por $A_{2a}$; therefore, the proportioning piston $26a$ is moved rightwardly toward its metering position disengaging the valve member $33a$ thereof from the seating member valve seat $32a$ to effect a metered application of the increased fluid pressure $P_o$ through the seating member aperture $34a$ and the outlet chamber $39a$ to the outlet port 24 to effect a proportional increase of the output fluid pressure Por in a predetermined ratio with the fluid pressure $P_o$ in the inlet chamber $38a$, as shown by the line UV in the graph of FIG. 3 wherein $$Por = (P_o (A_{2a}-A_{1a}) + F/A_{2a}$$

Of course, the increased output fluid pressure Por effects a corresponding increase in the output force Por $A_{2a}$, and when the increased output force Por $A_{2a}$ attains an increased value substantially equal to that of the increased input force $P_o (A_{2a}-A_{1a})$ and the additive metering spring force $F_s$, the proportioning piston $26a$ is again moved leftwardly toward its isolating position to reengage the valve member $32a$ thereof with the seating member valve seat $33a$ to again isolate the increased fluid pressure $P_o$ from the increased output fluid pressure Por. It is, of course, obvious that the proportioning piston $26 a$ will be responsive to further increases in the fluid pressure $P_o$ to effect further correspondingly proportional increases in the output fluid pressure Por in the same manner as previously described.

When the master cylinder is de-actuated, the input fluid pressure P is vented to the atmosphere which effects de-energization of the front brake 4 and eliminates the input force $P(A_2-A_1)$ acting on the proportioning piston 26. Upon the elimination of the input force $P(A_2-A_1)$, the fluid pressure $P_o$ acting on the seating member 35 displaces the sealing lip 36 thereof from sealing engagement with the housing counterbore 12 to open the return flow passages 37 across said seating member, and in this manner, the fluid pressure $P_o$ returns from the inlet chamber $38a$ through the connecting passage 25, the outlet chamber 39, the open return flow passages 37, the inlet chamber 38, the inlet port 23 and conduits 5,3 to the master cylinder 2. When the fluid pressure $P_o$ is so reduced to correspondingly reduce the output force $P_oA_2$ to a value less than the metering spring force $F_c$, the metering spring 31 moves the proportioning piston 26 leftwardly to its original or inoperative position re-engaging the stop 30 with the housing 9 and disengaging the valve member 32 from the seating member valve seat 33 to again open the seating member aperture 34 re-establishing open pressure fluid communication therethrough between the inlet and outlet chambers 38, 39 to effect complete elimination of the fluid pressure $P_0$. While the fluid pressure $P_o$ is being reduced to effect complete reduction of the output force $P_o A_2$ on the proportioning piston 26, as described hereinabove, it is apparent that such reduction of the fluid pressure $P_o$ also effects a simultaneous corresponding reduction of the input force $P_o(A_{2a}-A_{1a})$ acting on the proportioning piston $26a$, and upon the elimination of the input force $P_o(A_{2a}-A_{1a})$, the output fluid pressure Por acting on the seating member $35a$ displaces the sealing lip $36a$ thereof from sealing engagement with the housing counterbore $12a$ to open the seating member return flow passages $37a$. In this manner, the fluid pressure Por returns from the rear brake 8 through the conduit 7, and outlet port 24 of the control valve 6, the outlet chamber $39a$, the open return flow passage $37a$ of the seating member 35 into the inlet chamber $38a$ and therefrom to the master cylinder 2, as previously described. When the fluid pressure Por is so reduced to correspondingly reduce the output force Por $A_{2a}$ to a value less than the metering spring force $F_s$, the metering spring $31a$ moves the proportioning piston $26a$ rightwardly to its original position re-engaging the stop $30a$ with the housing 9 and disengaging the valve member 32 $a$ from the seating member valve seat $33a$ to again open the seating member valve seat $33a$ to again open the seating member aperture $34a$ re-establishing open pressure fluid communication between the inlet and outlet ports 23, 24 through the flow passage B to effect the complete elimination fluid pressure Por.

While the foregoing description of the system 1 and control valve 6 illustrates the proportioning operation of the proportioning member 27 to vary the fluid pressure immediately downstream thereof in response to the fluid pressure immediately upstream thereof in the flow passage B prior to the proportioning operation of the proportioning member $27a$ to vary the fluid pressure immediately downstream thereof in response to the fluid pressure immediately upstream thereof in said flow passage, it is also contemplated that the proportioning operation of the proportioning member 27a can be, if desired, initiated prior to that of the proportioning member 27 by increasing the precompressive force $F_s$ of the metering spring 32a to a value predeterminately greater than the precompressive force Fc of the metering spring 32 without substantially altering the operating characteristics of the system 1 and control valve 6.

From the foregoing, it is now apparent that a novel system 1 and control valve 6 are disclosed and that changes or modifications as to the precise configurations, shapes, and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing having a pressure fluid flow passage therethrough, a pair of proportioning members respectively movable in said flow passage in series flow relation for performing proportioning operations on the pressure fluid in said flow passage, one of said proportioning members being initially movable in response to fluid pressure of a predetermined value toward a position in said flow passage isolating the pressure fluid upstream thereof from that downstream thereof and being thereafter further movable in response to increases in the fluid pressure upstream thereof toward a metering position effecting a metered increase in the fluid pressure downstream thereof in one predetermined ratio with the increased fluid pressure upstream thereof, and the other of said proportioning members being initially movable in response to fluid pressure of another predetermined value predeterminately different than the first named predetermined value toward a position in said flow passage isolating the fluid pressure upstream thereof from that downstream thereof and being thereafter further movable in response to increases in the fluid pressure upstream thereof toward a metering position effecting a metered increase in the fluid pressure downstream thereof in another predetermined ratio predeterminately different than the first named predetermined ratio with the increased fluid pressure upstream thereof, and the metered fluid pressure of one of said one and other proportioning members having a continuing and variable affect on the metered fluid pressure of the other of said one and other proportioning members wherein the metered fluid pressure acting on the downstream one of said one and other proportioning members is a function of the product of the first named and other predetermined ratios.

2. A control valve according to claim 1, wherein one of said first named and other predetermined ratios is greater than the other of said first named and other predetermined ratios.

3. A control valve according to claim 1, wherein said one proportioning member includes a proportioning piston movable in said housing, and resilient means engaged with said proportioning piston, said proportioning piston being movable against the force of said resilient means toward its isolating position and the force of said resilient means assisting movement of said proportioning piston toward its metering position.

4. A control valve according to claim 1, wherein said other proportioning member includes a proportioning piston movable in said housing, and resilient means engaged with said proportioning piston, said proportioning piston being movable against the force of said resilient means toward its isolating position and the force of said resilient means assisting movement of said proportioning piston toward its metering position.

5. A control valve according to claim 1, wherein said one and other proportioning members include first and second proportioning piston means slidable in said housing, and first and second spring means engaged with said first and second piston means, the forces of said first and second spring means opposing and assisting movement of said first and second proportioning piston means toward their isolating and metering positions, respectively.

6. A control valve according to claim 5, comprising first and second valve seats in said housing about said flow passage for engagement with said first and second proportioning piston means, said first and second valve seats being engaged by said first and second proportioning piston means in their isolating positions and said first and second proportioning piston means being disengaged from said first and second valve seats in their metering positions, respectively.

7. A control valve according to claim 6, comprising first and second valve means on said first and second proportioning piston means for engagement with said first and second valve seats, said first and second valve means being engaged with said first and second valve seats when said first and second proportioning piston means are in their isolating positions and disengaged therefrom when said first and second proportioning piston means are in their metering positions, respectively.

8. A control valve according to claim 5, comprising first and second pairs of opposed effective areas on said first and second proportioning piston means subjected to fluid pressure immediately upstream and downstream thereof in said flow passage, respectively, the fluid pressure immediately upstream of said first and second proportioning piston means in excess of said first named and other predetermined values acting on one of the areas of said first and second area pairs to assist said first and second spring means urging said first and second proportioning piston means toward their metering positions and the fluid pressure immediately downstream of said first and second proportioning piston means acting on the other of said areas of said first and second area pairs to oppose movement of said first and second proportioning piston means to their metering positions, respectively.

9. A control valve comprising a housing having an inlet and outlet port therein, proportioning means movable in said housing for controlling pressure fluid communication between said inlet and outlet ports, said proportioning means being movable in response to fluid pressure at said inlet port in excess of a predetermined value to effect metered pressure fluid communication between said inlet and outlet port and establish a reduced fluid pressure at said outlet port in a predetermined ratio with that at said inlet port, and other proportioning means movable in said housing in series flow relation with said first named proportioning means between said first named proportioning means and said outlet port for controlling pressure fluid communication therebetween, said other proportioning means being movable in response to the reduced fluid pressure of another predetermined value predeterminately in excess of the first named predetermined value to effect metered pressure fluid communication between said first named proportioning means and said outlet port to establish another reduced fluid pressure at said outlet port in another predetermined ratio with the first named reduced fluid pressure wherein the other reduced fluid pressure is a function of the product of the first named and other predetermined ratios.

10. A control valve comprising a housing, first inlet and outlet chambers in said housing, a first proportioning member movable in said housing for controlling pressure fluid communication between said first inlet and outlet chambers, said first proportioning member being initially movable in response to fluid pressure in said first inlet and outlet chambers of a predetermined value toward a position isolating said first inlet chamber from said first outlet chamber and being thereafter further movable in response to increases in the fluid pressure in said first inlet chamber in excess of the predetermined value toward a position effecting metered pressure fluid communication between said first inlet and outlet chambers to establish fluid pressure in said first outlet chamber in a predetermined ratio with the increased fluid pressure in said first inlet chamber, second inlet and outlet chambers in said housing, means in said housing connecting said first outlet chamber in open pressure fluid communication with said second inlet chamber, and a second proportioning member movable in said housing for controlling pressure fluid communication between said second inlet and outlet chambers, said second proportioning member being initially movable in response to the established fluid pressure in said first outlet chamber and said second inlet and outlet chambers of another predetermined value different than the first named predetermined value toward a position isolating said second inlet chamber from said second outlet chamber and being thereafter further movable in response to increases in the established fluid pressure in said first outlet chamber and said second inlet chamber in excess of the other predetermined value toward a position effecting metered pressure fluid communication between said second inlet and outlet chambers to establish another fluid pressure in said second outlet chamber in another predetermined ratio with the increased established fluid pressure in said first outlet chamber and second inlet chamber wherein the fluid pressure established in said second outlet chamber is a function of the product of the first named and other ratios.

11. In a hydraulic brake system having a fluid pressure responsive brake, a master cylinder for establishing fluid pressure in said system to energize said brake, and a pair of proportioning valve means in said system in series flow relation for performing proportioning operations on the established fluid pressure in said system, said proportioning valve means being generally operable in response to fluid pressures immediately upstream thereof of one and other predetermined values to reduce the fluid pressures immediately downstream thereof in said system in one and other ratios respectively, wherein the reduced fluid pressure of the downstream one of said proportioning valve means is a function of the one and other ratios.

12. In a hydraulic brake system having at least one pressure supply and at least one pressure responsive brake, and a pair of proportioning valves in series flow relation in said system with said proportioning valves being operable generally for reducing the pressure from said supply to said brake under preselected conditions, one of said proportioning valves being responsive to the pressure of said supply in excess of a predetermined value to effect a reduced pressure through the other of said proportioning valves to said brake in a predetermined ratio with the pressure at said supply and said other proportioning valve being responsive to the reduced pressure in excess of another predetermined value predeterminately in excess of the first named predetermined value to effect another reduced fluid pressure to said brake in another predetermined ratio with the first named reduced fluid pressure wherein the other reduced fluid pressure is a function of the product of the first named and other ratios.

13. In a hydraulic brake system having a pressure responsive brake and a pressure supply for selectively pressurizing said brake, and a pair of proportioning valves connected in series flow relation in said system for respectively controlling the application to said brakes of pressure supplied from said supply under preselected conditions, one of said proportioning valves being initially movable in response to the supplied and applied pressures of a predetermined value toward a position isolating said supply from the other of said proportioning valves and said brake and being thereafter further movable in response to increases in the supplied pressure in excess of the predetermined value toward a metering position to effect of a metered increase in the pressure applied through the other of said proportioning valves to said brake in a predetermined ratio with the increased supplied pressure and said other proportioning valve being initially movable in response to the pressure applied from said one proportioning valve to said brake of another predetermined value predeterminately in excess of the first named predetermined value toward a position isolating said one proportioning valve from said brake and being thereafter further movable in response to increases in the pressure applied from said one proportioning valve in excess of the other predetermined value toward a metering position to effect a further metered increase in the pressure applied to said brake in another predetermined ratio with the increased pressure applied from said one proportioning valve wherein the fluid pressure applied to said brake is a function of the product of the first named and other predetermined ratios.

14. In a hydraulic brake system having a pressure responsive brake, a pressure supply in said system for selectively pressurizing said brake, and a device connected in said system between said supply and brake for controlling the application to said brakes of pressure supplied from said supply under preselected conditions, said device comprising passage means connected with said supply and said brakes, a first proportioning valve movable in said passage means in response to pressure applied therethrough from said supply to said brake of a predetermined value toward a position closing said passage means and being thereafter further movable in response to increases in the pressure from said source in excess of the predetermined value toward another position in said passage means establishing metered communication therethrough between said supply and brake to effect a metered increase in the pressure applied to said brake in a predetermined ratio with the increased pressure from said supply, and a second proportioning valve movable in said passage means between said first proportioning valve and said brake, said second proportioning valve being movable in response to the pressure applied therethrough from said first proportioning valve to said brake of another predetermined value predeterminately greater than the first named predetermined value toward a position closing said passage means and being thereafter further movable in response to increases in the pressure from said first proportioning valve in excess of the other predetermined value toward another position in said passage means establishing metered communication therethrough between said first proportioning valve and said brake to effect another metered increase in the pressure applied to said brake in another predetermined ratio with the increased pressure from said first proportioning valve wherein the value of the fluid pressure applied to said brake from said second proportioning valve is a function of the product of the first named and other predetermined ratios.

15. A control valve comprising a housing having a pair of sets of inlet and outlet chambers therein connected in series flow relation, and a pair of proportioning members movable in said housing between the inlet and outlet chambers of said chamber sets for performing fluid pressure proportioning operations therebetween under preselected conditions, said proportioning members being operable generally in response to fluid pressures in excess of one and other predetermined values in said inlet chambers of said chamber sets to reduce the fluid pressures in the outlet chambers of said chamber sets in one and other predetermined ratios with the fluid pressures in said inlet chambers of said chamber sets, respectively, and the reduced fluid pressure in one of the outlet chambers of said chamber sets acting on one of said proportioning members having a continued and varying affect on the reduced fluid pressure in the other of the outlet chambers of said chamber sets acting on the other of said proportioning members wherein the reduced fluid pressure acting on the downstream one of said one and other proportioning members is a function of the product of the one and other ratios.

16. A control valve comprising a housing having a pair of sets of inlet and outlet chambers therein, a pair of proportioning members movable in said housing between the inlet and outlet chambers of said chamber sets for performing fluid pressure proportioning operations therebetween, respectively, said proportioning members being operable generally in response to the fluid pressures in said inlet chambers of said chamber sets in excess of one and other predetermined values to reduce the fluid pressures in the outlet chambers of said chamber sets in one and other predetermined ratios with the fluid pressures in the inlet chambers of said chamber sets, respectively, means in said housing connecting one of the outlet chambers of one of said chamber sets in pressure fluid communication with one of the inlet chambers of the other of said chamber sets wherein the reduced fluid pressure in one of said one and the other of said outlet chambers of said chamber sets acting on the down-stream one of said proportioning members is a function of the product of the one and other ratios.

17. A control valve according to claim 16, wherein one of said one and other predetermined ratios is greater than the other thereof.

18. A control valve according to claim 16, wherein one of said one and other predetermined values is greater than the other thereof.

19. A control valve according to claim 16, wherein said proportioning members include a pair of resiliently urged means, said resiliently urged means being movable against their own forces in response to the fluid pressures in said inlet and outlet chambers of said chamber sets of the one and other predetermined values toward positions isolating said inlet and outlet chambers of said chamber sets and the forces of said resiliently urged means thereafter assisting the fluid pressures in excess of the one and other predetermined values in said inlet chambers of said chamber sets acting on said resiliently urged means to urge said resiliently urged means toward a metering position effecting metered pressure fluid communication between the inlet and outlet chambers of said chamber sets and establishing metered fluid pressures in the outlet chambers of said chamber sets in the one and other predetermined ratios with the fluid pressures in the inlet chambers of said chamber sets, respectively.

20. A control valve according to claim 19, wherein said resiliently urged means include a pair of proportioning pistons, and a pair of resilient means engaged with proportioning pistons, said proportioning pistons being movable against the forces of said resilient means toward their isolating positions and the forces of said resilient means urging said proportioning pistons toward their metering positions, respectively.

21. A control valve according to claim 20, comprising a pair of valve seats in said housing between said inlet and outlet chambers of said chamber sets for engagement with said proportioning pistons, said proportioning pistons being engaged with said valve seats in their isolating positions and being disengaged from said valve seats in their metering positions, respectively.

22. A control valve according to claim 21, comprising a pair of valve means on said proportioning pistons for engagement with said valve seats, said valve means being engaged with said valve seats in the isolating positions of said proportioning pistons and being disengaged from said valve seats in the metering positions of said proportioning pistons, respectively.

23. A control valve according to claim 20, comprising a pair of opposed areas on said proportioning pistons subjected to the fluid pressures in the inlet and outlet chambers of said chamber sets, respectively, the fluid pressures in excess of the one and other values in said inlet chambers of said chamber sets acting on one of the opposed areas of said proportioning pistons to assist said resilient means and urge said proportioning pistons toward their metering positions and the fluid pressures in said outlet chambers of said chamber sets acting on the other of said opposed areas of said proportioning pistons to oppose movement thereof toward their metering positions, respectively.

24. A control valve according to claim 23, wherein said other area of each of said proportioning pistons is predeterminately greater than said one area of each of said proportioning pistons.

25. A control valve comprising a housing having inlet and outlet ports therein, a pair of proportioning valves movable in said housing in series flow relation between said inlet and outlet ports and operable generally to perform proportioning operations on pressure fluid flow from said inlet port to said outlet port under preselected conditions, respectively, each of said proportioning valves having inlet and outlet sides, one of said proportioning valves being responsive to fluid pressure in excess of a predetermined value at one of said inlet port and the outlet side of the other of said proportioning valves to proportionally reduce the fluid pressure at one of said outlet ports and the inlet side of said other proportioning valve in a predetermined ratio with the fluid pressure acting thereon in excess of the predetermined value at the one of said inlet port and the outlet said of said other proportioning valve, and said other proportioning valve being responsive to the fluid pressure in excess of another predetermined value at one of said inlet port and the outlet side said one proportioning valve to proportionally reduced the fluid pressure at one of said outlet port and the inlet side of said one proportioning valve in another predetermined ratio with the fluid pressure acting thereon in excess of the other predetermined value at the one of said inlet port and the outlet side of said one proportioning valve wherein the reduced fluid pressure acting on the downstream one of said one and other proportioning valves is a function of the first named and other ratios.

26. A brake system comprising a brake, fluid pressure generating means for applying fluid pressure to said brake to effect energization thereof, and a pair of proportioning valves connected in said system in series flow relation between said generating means and said brake and operable generally to perform proportioning operations on the applied fluid pressure in said system under preselected conditions, respectively, one of said proportioning valves being responsive to the fluid pressure applied thereto in excess of a predetermined value from one of said generating means and the other of said proportioning valves to proportionally reduce in a predetermined ratio the fluid pressure applied to one of said brake and said other proportioning valve, and said other proportioning valve being responsive to the fluid pressure applied thereto in excess of another predetermined value from one of said generating means and said one proportioning valve to proportionally reduce in another predetermined ratio the fluid pressure applied to one of said brake and said one proportioning valve wherein the reduced fluid pressure acting on the downstream one of said one and other proportioning valve is a function of the product of said first named and other ratios.

27. A brake system comprising a brake, means for applying fluid pressure to said brake to effect energization thereof, and other means for controlling the application of the fluid pressure from said first named means to said brake including a pressure fluid flow passage connected between said first named means and said brake, and a pair of proportioning valves movable in said flow passage in series flow relation and operable generally in response to applied fluid pressure immediately upstream thereof in excess of one and other different predetermined values in said flow passage to perform proportioning operations thereon and establish reduced fluid pressures immediately downstream thereof in one and other predetermined ratios with the fluid pressures immediately upstream thereof, respectively, wherein the reduced fluid pressure acting on the downstream one of said proportioning valves is a function of the product of the one and other ratios.

28. A fluid pressure system comprising at least one brake, means for applying fluid pressure to said one brake to effect energization thereof, and other means for controlling the fluid pressure applied from said first named means to said one brake including a pair of sets of inlet and outlet chambers in series flow relation, the inlet chamber of one of said chamber sets being connected with said first named means and the outlet chamber of the other of said chamber sets being connected with said one brake, and a pair of proportioning valves between the inlet and outlet chambers of said one and other chamber sets for performing proportioning operations on the applied fluid pressure, said proportioning valves being responsive to the applied fluid pressure in excess of one and other predetermined values in the inlet chambers of said one and other chamber sets to proportionally reduce the applied fluid pressure in the outlet chambers of said one and other chamber sets in one and other predetermined ratios with the fluid pressures in excess of the one and other predetermined values in the inlet chambers of said one and other chamber sets, respectively, wherein the reduced fluid pressure in the outlet chamber of said other chamber set is a function of the product of the one and other ratios.

29. A fluid pressure system according to claim 28, comprising means in said other means for connecting the inlet chamber of said other chamber set in pressure fluid communication with the outlet chamber of said one chamber set.

30. A control valve comprising a housing having a pressure fluid flow passage therethrough, a pair of proportioning valves movable in said flow passage in series flow relation for performing proportioning operations on the pressure fluid in said flow passage, said proportioning valves being operable generally in response to fluid pressures immediately upstream thereof in excess of one and other predetermined values to establish reduced fluid pressures immediately downstream thereof in one and other predetermined ratios with the fluid pressures immediately upstream thereof in excess of the one and other predetermined values, respectively, and the reduced fluid pressure acting on one of said proportioning valves having a continued and varying affect on the reduced output fluid pressure acting on the other of said proportioning valves wherein the reduced fluid pressure acting on the downstream one of said one and other proportioning valves is a function of the product of the one and other ratios.

* * * * *

UNITED STATES PATENT OFFICE
CERTIFICATE OF CORRECTION

Patent No. 3,697,138          Issued October 10, 1972

Paul G. Marting

It is certified that error appears in the above-identified patent and that said Letters Patent are hereby corrected as shown below:

Column 4, line 2, "32" should read -- 31 --; line 44, "ration" should read -- ratio --; line 47, "Po = (P $(A_2 - A_1)$ + Fc/$A_2$)" should read -- Po = $\frac{P(A_2-A_1) + Fc}{A_2}$ --. Column 5, line 15, delete the comma -- , --; line 38, "33a" should read -- 32a --; line 39, "32a" should read -- 33a --; line 47, "Por = (Po($A_{2a}-A_{1a}$ + F/$A_{2a}$" should read -- Por = $\frac{Po (A_{2a}-A_{1a}) + Fs}{A_{2a}}$ --. Column 6, line 31, "Po($A_{2a}=A_{1a}$" should read -- Po($A_{2a}-A_{1a}$) --; line 50, delete "to again open the seating member valve seat 33a".

Signed and sealed this \_\_\_\_ day of _____ 19\_\_\_.

Signed and sealed this 1st day of May 1973.

(SEAL)
Attest:

EDWARD M. FLETCHER, JR.        ROBERT GOTTSCHALK
Attesting Officer                  Commissioner of Patents